(12) United States Patent
Hessling-Von Heimendahl et al.

(10) Patent No.: US 10,266,281 B2
(45) Date of Patent: Apr. 23, 2019

(54) METHOD OF OPERATING AN AIRCRAFT HEADLIGHT SYSTEM, AIRCRAFT HEADLIGHT SYSTEM, AND AIRCRAFT COMPRISING THE SAME

(71) Applicant: Goodrich Lighting Systems GmbH, Lippstadt (DE)

(72) Inventors: Andre Hessling-Von Heimendahl, Koblenz (DE); Christian Schoen, Mainz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/845,106

(22) Filed: Dec. 18, 2017

(65) Prior Publication Data

US 2018/0170577 A1 Jun. 21, 2018

(30) Foreign Application Priority Data

Dec. 18, 2016 (EP) .................................... 16204907

(51) Int. Cl.
*H05B 33/08* (2006.01)
*B64D 47/04* (2006.01)
(Continued)

(52) U.S. Cl.
CPC ............. *B64D 47/04* (2013.01); *B64D 47/06* (2013.01); *F21S 41/141* (2018.01);
(Continued)

(58) Field of Classification Search
CPC ................ H05B 33/08; H05B 33/0809; H05B 33/0815; H05B 33/0845; B64D 47/04;
(Continued)

(56) References Cited

U.S. PATENT DOCUMENTS 9,340,148 B2 5/2016 Ehlgen et al.
2008/0137353 A1 6/2008 Larsen
(Continued)

FOREIGN PATENT DOCUMENTS

| EP | 2514673 A1 | 10/2012 | |
| EP | 2604521 A1 | 6/2013 | |
| EP | 2995501 A1 * | 3/2016 | ............. B64D 47/04 |

OTHER PUBLICATIONS

European Search Report for Application No. 16204907.6-1754, dated Jun. 28, 2017, 8 pages.

*Primary Examiner* — Jimmy T Vu (74) *Attorney, Agent, or Firm* — Cantor Colburn LLP (57) ABSTRACT

A method of operating an aircraft headlight system of an aircraft, the aircraft headlight system having at least one headlight, includes the steps of operating the aircraft headlight system in a landing light mode during a descent of the aircraft, with the at least one headlight emitting a landing light output in the landing light mode; operating the aircraft headlight system in a taxi light mode during taxiing of the aircraft, with the at least one headlight emitting a taxi light output in the taxi light mode; and transforming the landing light output into the taxi light output after touch-down of the aircraft by operating the aircraft headlight system in at least one intermediate lighting mode between operating the aircraft headlight system in the landing light mode and operating the aircraft headlight system in the taxi light mode.

15 Claims, 8 Drawing Sheets

(51) Int. Cl.
  F21S 41/663      (2018.01)
  F21S 41/19       (2018.01)
  F21S 41/141      (2018.01)
  F21S 41/32       (2018.01)
  F21S 41/20       (2018.01)
  B64D 47/06       (2006.01)
  F21S 41/143      (2018.01)
  F21S 41/147      (2018.01)
  F21S 41/25       (2018.01)
  F21S 41/153      (2018.01)
  F21S 41/145      (2018.01)
  F21Y 115/10      (2016.01)
  F21W 107/30      (2018.01)

(52) U.S. Cl.
  CPC ........... *F21S 41/143* (2018.01); *F21S 41/145* (2018.01); *F21S 41/147* (2018.01); *F21S 41/153* (2018.01); *F21S 41/192* (2018.01); *F21S 41/25* (2018.01); *F21S 41/285* (2018.01); *F21S 41/321* (2018.01); *F21S 41/663* (2018.01); *H05B 33/0845* (2013.01); *B64D 2203/00* (2013.01); *F21W 2107/30* (2018.01); *F21Y 2115/10* (2016.08)

(58) Field of Classification Search
  CPC ..... B64D 47/06; B64D 2203/00; F21S 41/25; F21S 41/663; F21S 41/147; F21S 41/143; F21S 41/153; F21S 41/192; F21S 41/141; F21S 41/321; F21S 41/145; F21S 41/285; F21Y 2115/10; F21W 2107/30
  USPC .......... 315/82, 151–159, 291, 297, 307, 308
  See application file for complete search history.

(56) References Cited

U.S. PATENT DOCUMENTS

| | | |
|---|---|---|
| 2012/0140498 A1 | 6/2012 | Fabbri et al. |
| 2015/0035440 A1 | 2/2015 | Spero |
| 2015/0232198 A1* | 8/2015 | Seibt .................... B64D 47/02 362/470 |
| 2016/0076722 A1 | 3/2016 | Hessling Von Heimendahl |

* cited by examiner

METHOD OF OPERATING AN AIRCRAFT HEADLIGHT SYSTEM, AIRCRAFT HEADLIGHT SYSTEM, AND AIRCRAFT COMPRISING THE SAME

FOREIGN PRIORITY

This application claims priority to European Patent Application No. 16204907.6 filed Dec. 18, 2016, the entire contents of which is incorporated herein by reference.

TECHNICAL FIELD

The present invention is in the field of exterior aircraft lighting. In particular, the present invention is in the field of aircraft headlight systems.

BACKGROUND

Almost all aircraft have exterior lighting. In particular, large commercial aircraft, such as passenger or cargo airplanes, have a wide variety of exterior lights. On the one hand, exterior lights are provided for passive visibility and signalling purposes. Examples of such lights are white anti-collision lights, also referred to as strobe lights, red anti-collision lights, also referred to as beacon lights, and navigation lights. On the other hand, various lights are provided for active visibility for the pilots and/or crew. Examples are landing lights, take-off lights, taxi lights, and runway turn-off lights, which are provided for active forward visibility for the pilots, as well as engine scan lights and wing scan lights, which are provided for the inspection of proper operation of aircraft components. Further, various special purpose lights, such as cargo lights, may be provided as well. While exterior aircraft lighting is beneficial in general, the light output by the exterior aircraft lights also carries a risk of being disturbing to the pilots or even disruptive to the pilots' awareness of the environment, such as due to blinding reflections of the light.

Accordingly, it would be beneficial to provide exterior aircraft lighting and a method of operating exterior aircraft lighting in a way that has low pilot disturbance.

BACKGROUND

Exemplary embodiments of the invention include a method of operating an aircraft headlight system of an aircraft, the aircraft headlight system having at least one headlight, wherein the method comprises the steps of operating the aircraft headlight system in a landing light mode during a descent of the aircraft, with the at least one headlight emitting a landing light output in the landing light mode; operating the aircraft headlight system in a taxi light mode during taxiing of the aircraft, with the at least one headlight emitting a taxi light output in the taxi light mode; and transforming the landing light output into the taxi light output after touch-down of the aircraft by operating the aircraft headlight system in at least one intermediate lighting mode between operating the aircraft headlight system in the landing light mode and operating the aircraft headlight system in the taxi light mode.

Exemplary embodiments of the invention allow for the switching from a landing light mode to a taxi light mode after touch-down of the aircraft in a manner that is little disruptive to the pilots' awareness of the environment on the runway/airfield. In particular, a hard switch between the landing light mode and the taxi light mode, which results in an abrupt change of the illumination of the aircraft environment and thus poses a large burden on the pilots' eyes in terms of adapting to the changed illumination, may be prevented by transforming the landing light output into the taxi light output via at least one intermediate lighting mode. The transforming of the landing light output into the taxi light output via one or more intermediate lighting modes may provide for a soft transition between the landing light mode and the taxi light mode. In this way, the pilots' eyes may more easily adapt to various smaller steps/changes in the light output, as compared to a big step between the landing light output and the taxi light output. In this way, the operating safety of the aircraft may be increased, because the pilot can have a more uninterrupted awareness of the aircraft environment due to the eyes adapting faster to smaller changes in the light output of the aircraft headlight system.

The aircraft headlight system is operated in at least one intermediate lighting mode between operating the aircraft headlight system in the landing light mode and operating the aircraft headlight system in the taxi light mode. Each of the at least one intermediate lighting mode has a respective intermediate light output, which is emitted by the at least one headlight in the at least one intermediate lighting mode. In terms of the output light intensity distribution, the at least one intermediate light output is more similar to the landing light output and to the taxi light output than the landing light output is to the taxi light output. In other words, the similarity in output light intensity distribution between each of the at least one intermediate light output and the the taxi light output is greater than the similarity in output light intensity distribution between the landing light output and the taxi light output. Analogously, the similarity in output light intensity distribution between each of the at least one intermediate light output and the the landing light output is greater than the similarity in output light intensity distribution between the landing light output and the taxi light output. The similarity between two output light intensity distributions may be calculated as the integral over the difference between the output light intensity distributions in question or by any other suitable measure. The above described relations for the similarities between the output light intensity distributions in question is reflected by the term intermediate lighting mode, which indicates a middle state between the landing light mode and the taxi light mode, as well as the term transforming the landing light output into the taxi light output, which indicates a targeted adaptation towards the taxi light output.

The aircraft headlight system is operated in a taxi light mode during taxiing of the aircraft. While the term taxi light mode is used, this taxi light mode may also be referred to as a combined taxi and runway turn-off light mode. During taxiing of the aircraft, the aircraft headlight system may carry out both the functions of a more forward-directed ground illumination light, sometimes referred to as taxi light in a narrow sense, and a more sideway-directed/angled ground illumination light, sometimes referred to as runway turn-off light.

The operating of the aircraft headlight system in the taxi light mode, as described above, may take place after the operating of the aircraft headlight system in the landing light mode during the descent of the aircraft. In other words, above references to the operating of the aircraft headlight system in the taxi light mode may refer to the operation of the aircraft headlight system after landing. Accordingly, the step of operating the aircraft headlight system in the taxi light mode may refer to the taxiing from the runway towards the gate. As a consequence, the step of transforming the landing light output into the taxi light output may refer to the operation of the aircraft headlight system after landing and before reaching a state of continuous ground illumination for the taxiing on the airfield.

According to a further embodiment, that step of transforming the landing light output into the taxi light output lasts between 3 s and 10 s. In a particular embodiment, the step of transforming the landing light output into the taxi light output lasts between 4 s and 7 s. Further in particular, the step of transforming the landing light output into the taxi light output may last about 5 s. This metric is defined as the duration of the one or more intermediate lighting modes being present, i.e. as the duration between the end of the landing light mode and the beginning of the taxi light mode. The given durations have been found to provide a transition between the landing light mode and the taxi light mode that is pleasing to the pilots' eyes and that allows for a gradual adaptation with a low level of disturbance to the pilots. Also, the given durations are a good compromise between a pleasing transition from the landing light mode to the taxi light mode and a responsive behavior of the aircraft headlight system in response to the touch-down or in response to an according pilot command.

According to a further embodiment, the at least one intermediate lighting mode comprises a sequence of a plurality of intermediate lighting modes, with an intermediate output light intensity distribution of each of the plurality of intermediate lighting modes having a wider horizontal illumination angle than a respectively preceding one of the plurality of intermediate lighting modes. In this way, the landing light mode, having a comparably narrow horizontal opening angle, may be transformed into the taxi light mode, having a comparably wide horizontal opening angle, in a plurality of steps. In this way, the horizontal illumination angle is broadened in a plurality of steps, thus allowing for an easy adaptation of the pilots' eyes to becoming aware of a wider portion of the aircraft environment over time. It is pointed out that it is also possible that additional intermediate lighting modes are present that are not associated with a broadening of the output light intensity distribution. The described sequence of intermediate lighting modes with an increasing horizontal illumination angle may for example be a subset of the entirety of intermediate lighting modes.

According to a further embodiment, the intermediate output light intensity distribution of each of the plurality of intermediate lighting modes has a lower peak light intensity than the respectively preceding one of the plurality of intermediate lighting modes. In this way, a particularly effective adaptation of the pilots' eyes to the changing light output may be achieved, because the human eye tends to focus on the spots of brightest illumination and areas of similar illumination. By gradually decreasing the peak light intensity, the pilots' eyes are slowly adjusted to regions of lower illumination in a step-by-step process.

According to a further embodiment, the aircraft headlight systems has a take-off light mode and the at least one intermediate lighting mode comprises the take-off light mode. In particular, a take-off light output may be emitted by the aircraft headlight system in the take-off light mode. In this way, the transformation of the landing light output into the taxi light output passes through the take-off light output, thus making use of a light mode that is also used at other operation times, in particular right before and/or after take-off. By using the take-off light mode as one of the one or more intermediate lighting modes, the number of different light modes may be kept small and an efficient implementation of the aircraft headlight system and its operating methods may be achieved.

According to a further embodiment, the taxi light output has a horizontal taxi light illumination distribution that is between a reference cosine distribution around a straight ahead direction of the aircraft and the reference cosine distribution, multiplied by three. In this way, a particularly pleasing taxi light output may be achieved that has limited variations for each horizontal viewing angle with the straight ahead direction. Said horizontal taxi light illumination distribution may be present for a limited horizontal opening angle. For example, it may be present within an opening angle of at least +/−60° with respect to the straight ahead direction of the aircraft. Further in particular, it may be present for a horizontal opening angle of between +/−60° and +/−80° with respect to the straight ahead direction of the aircraft. In a particular embodiment, the reference cosine distribution may be in accordance with the formula $$E(\alpha)[lx]=\cos(\alpha*1.145)*E_{nom}.$$

According to a further embodiment, a vertical change of a peak intensity direction of the aircraft headlight system during the transforming of the landing light output into the taxi light output is between 2°/s and 8°/s, in particular between 2.5°/s and 3.5°/s, more in particular about 3°/s. In this way, the direction of peak intensity may rotate vertically in a manner similar to the rolling of the aircraft after touch-down. In this way, the adaptation of the light output may be particularly pleasing to the pilots' eyes, because the rotation of the peak intensity direction of the aircraft headlight system offsets the rolling of the aircraft, at least to some extent. It is pointed out that the vertical change of the peak intensity direction may be present during part of the transforming only. For example, the vertical change of the peak intensity direction may take place during a first phase of the transforming. Above described broadening of the output light intensity distribution may take place thereafter, with the peak intensity direction not experiencing a further change.

According to a further embodiment, the at least one intermediate lighting mode consists of at least three intermediate lighting modes, in particular of between three and fifteen intermediate lighting modes, further in particular of between five and ten intermediate lighting modes. In this way, a granular transition of the light output of the aircraft headlight system may be achieved, without causing excessive complexity for the operation of the aircraft headlight system. For each of the plurality of intermediate lighting modes, the similarity in output light intensity distribution to the preceding intermediate lighting mode and to the taxi light mode may be greater than the similarity in output light intensity distribution between the preceding intermediate lighting mode and the taxi light mode. In this way, an overall convergent transformation may be achieved.

Exemplary embodiments of the invention further include an aircraft headlight, configured for being mounted to an aircraft for illuminating an aircraft environment, the aircraft headlight comprising an LED group, comprising a plurality of LEDs, and an optical system, comprising at least one optical element, the optical system being associated with the LED group for shaping a light output from the light emitted by the LED group, wherein the LED group and the optical system are stationary within the aircraft headlight, with each LED of the LED group having a set position with respect to the optical system, wherein the aircraft headlight is configured to be operated in a landing light mode having a landing light output, a taxi light mode having a taxi light output and at least one intermediate lighting mode having at least one intermediate light output, with a respective subset of the plurality of LEDs being switched on in each of the landing light mode, the taxi light mode and the at least one intermediate lighting mode, and wherein the aircraft headlight is configured to transform the landing light output into the taxi light output by operating in the at least one intermediate lighting mode between operating in the landing light mode and operating in the taxi light mode. The additional features, modifications, and effects, as described above with respect to the method of operating an aircraft headlight system comprising an aircraft headlight, apply to the aircraft headlight in an analogous manner.

According to a further embodiment, the plurality of LEDs are dimmable. In addition to the plurality of LEDs being individually switchable between an on state and an off state, which allows for respective subsets to be switched on for the different operating modes, the plurality of LEDs being dimmable provides for additional degrees of freedom for designing the one or more intermediate lighting modes. The transforming of the landing light mode into the taxi light mode may be provided in a particularly granular and pleasing manner in this way.

According to a further embodiment, the aircraft headlight is configured to transform the landing light output into the taxi light output by operating in at least three intermediate lighting modes, in particular in between three and 15 intermediate lighting modes, further in particular in between five and ten intermediate lighting modes, between operating in the landing light mode and operating in the taxi light mode.

According to a further embodiment, the aircraft headlight is configured to transform the landing light output into the taxi light output over a transformation interval of between 3 s and 10 s, in particular of between 4 s and 7 s, further in particular of about 5 s.

According to a further embodiment, the aircraft headlight further comprises a control unit, wherein the control unit is configured to switch on the respective subsets of the plurality of LEDs in accordance with the landing light mode, the taxi light mode and the at least one intermediate lighting mode. In other words, the control unit is configured to individually control the plurality of LEDs in accordance with a momentarily desired light mode. In particular, the control unit may be configured to switch on/off particular subsets of LEDs and, if applicable, dim particular ones of the LEDs. The control unit may be configured to cause a set sequence of landing light mode, at least one intermediate lighting mode, and taxi light mode, with each of the at least one intermediate lighting mode having a set duration. The control unit may have a control input for receiving a pilot signal for starting the set sequence and/or for receiving an aircraft generated signal indicating the touch-down of the aircraft for starting the set sequence.

Exemplary embodiments of the invention further include an aircraft comprising at least one aircraft headlight, as described in any of the embodiments above. The additional features, modification, and effects, as described above with respect to the aircraft headlight, apply to the aircraft in an analogous manner. The aircraft may be an airplane or a helicopter.

According to a further embodiment, the aircraft, in particular an airplane, comprises one or two or three or four aircraft headlights, forming an aircraft headlight system of the aircraft. In a particular embodiment, the aircraft headlight system consists of three aircraft headlights, with a first aircraft headlight being mounted to a front running gear of the aircraft and a second and third aircraft headlights being mounted to a left wing root section and a right wing root section of the aircraft, respectively. Jointly providing the light modes via multiple headlights, such as the described three headlights, has been found to be a good compromise between complexity of the individual headlights and complexity of adapting and synchronizing the multiple headlights with respect to each other.

BRIEF DESCRIPTION OF THE DRAWINGS

Further exemplary embodiments of the invention are described in detail with respect to the accompanying Figures, wherein.

DETAILED DESCRIPTION

Figure 1A:
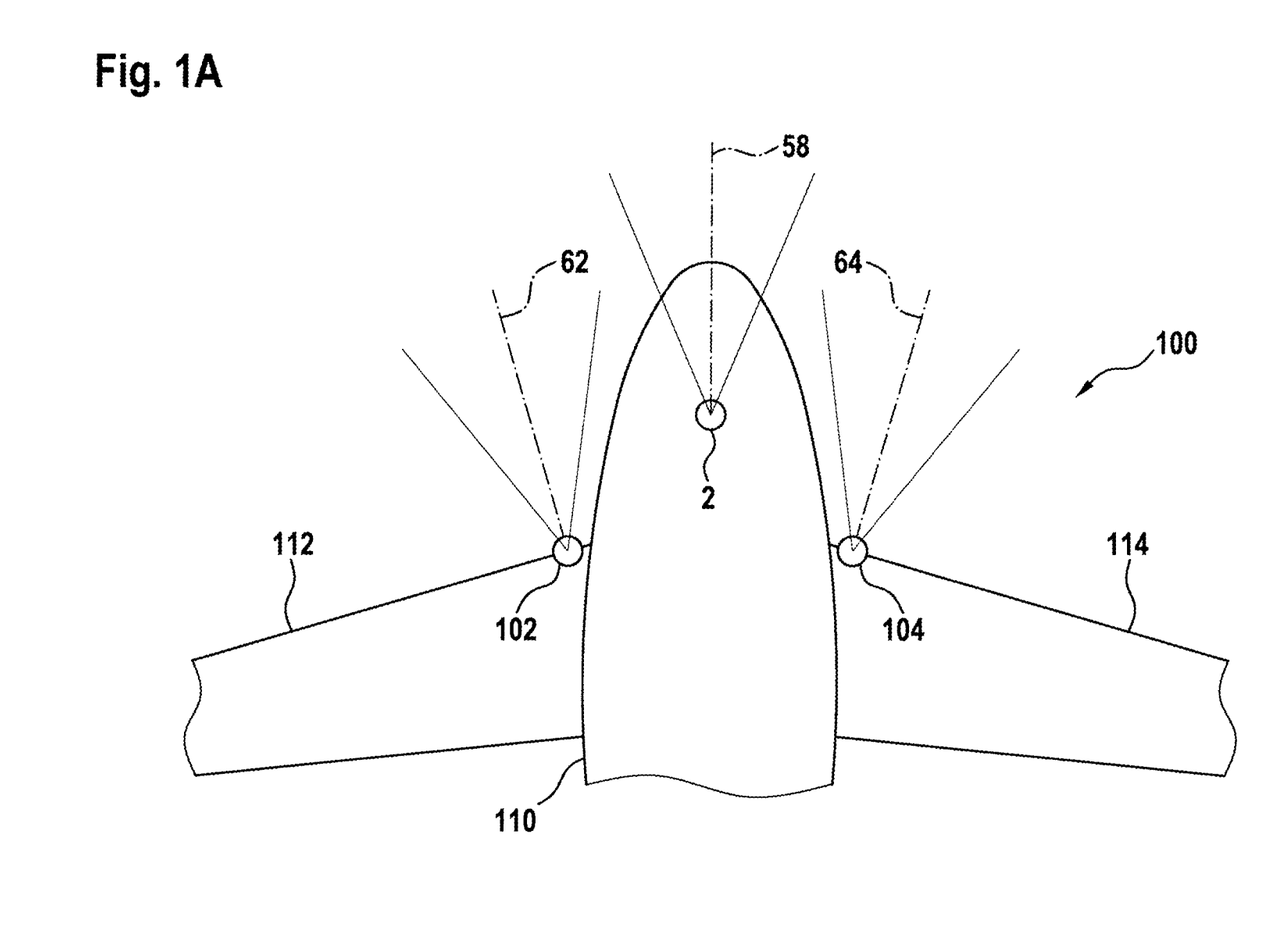
FIGS. 1A and 1B show an airplane in accordance with an exemplary embodiment of the invention in a schematic top view, the airplane being equipped with three aircraft headlights in accordance with exemplary embodiments of the invention.

FIG. 1A shows an exemplary aircraft 100, equipped with three aircraft headlights 2, 102 and 104 in accordance with exemplary embodiments of the invention. The aircraft 100 is shown in a schematic top view in FIG. 1A, with the aircraft fuselage 110, the left wing 112 and the right wing 114 being shown in FIG. 1A. The aircraft 100 is equipped with a central aircraft headlight 2, which is mounted to a front running gear of the aircraft 100. The aircraft 100 is further equipped with a left aircraft headlight 102 and a right aircraft headlight 104, which are mounted to the respective fronts of the respective root sections of the left and right wings 112, 114. The left and right aircraft headlights 102, 104 are spaced from the central aircraft headlight 2 by a distance of about 10 m in a longitudinal direction and by a distance of about 3 m in a lateral direction.

The central aircraft headlight 2 of the exemplary embodiment of FIG. 1A is oriented straight ahead, with the straight ahead direction being indicated with reference numeral 58. The straight ahead direction 58 coincides with the longitudinal direction of extension of the aircraft fuselage 110. The left and right aircraft headlights 102, 104 are angled with respect to this straight ahead orientation of the central aircraft headlight 2. This angled orientation of the left and right aircraft headlights 102, 104 is indicated by orientation directions 62, 64 of the left and right aircraft headlights 102, 104. FIG. 1A is only provided for qualitatively showing the angled orientation of left and right aircraft headlights 102, 104.

Figure 1B:
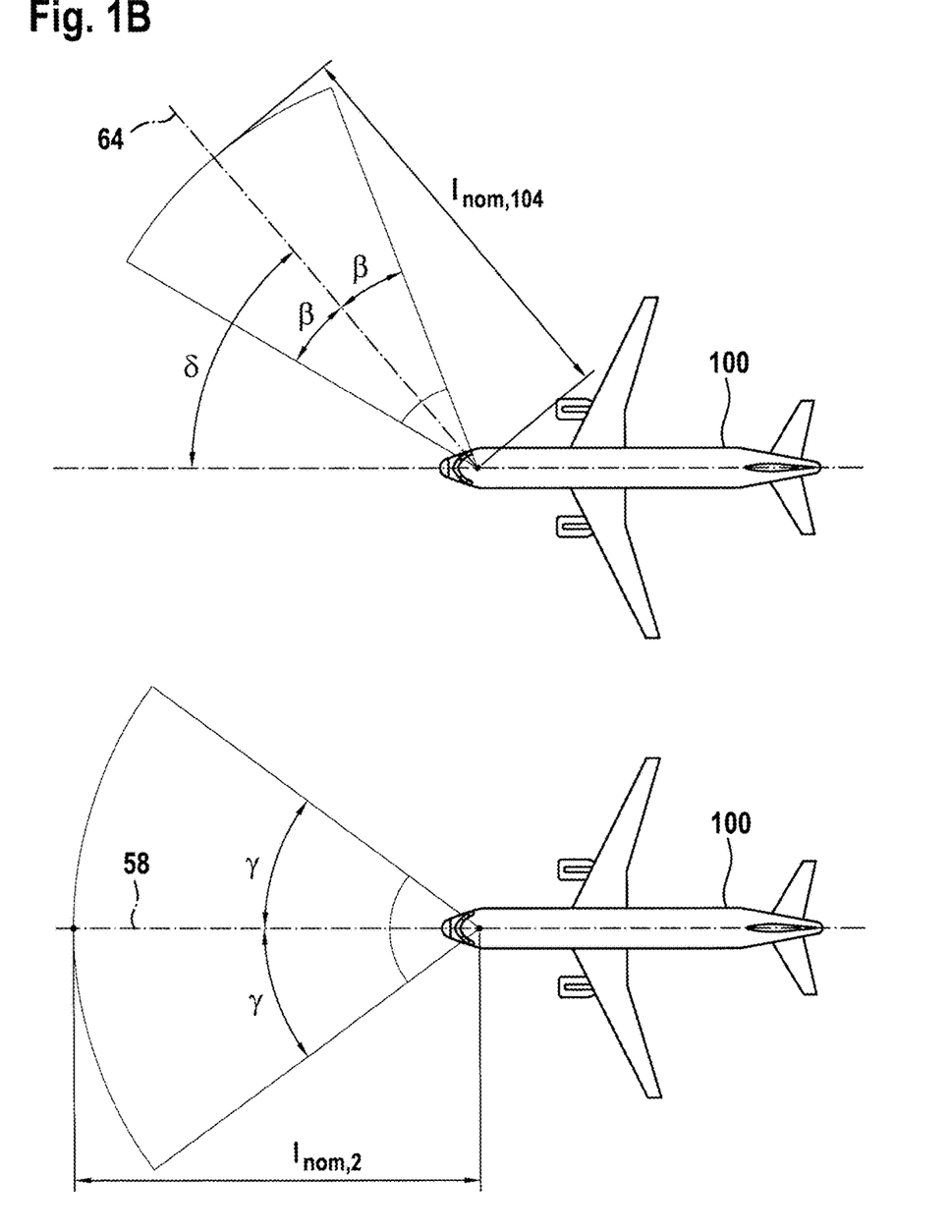

FIG. 1B shows the aircraft 100 of FIG. 1A, with exemplary horizontal opening angles of taxi light outputs of the aircraft headlights 2, 102, 104 being described in a quantitative manner. In the lower portion of FIG. 1B, a horizontal opening angle of 2*γ of the taxi light output of the central aircraft headlight 2 is depicted. In particular, the taxi light output has a horizontal opening angle of γ to each side of the straight ahead direction 58. The opening angle of 2*γ is defined as that angle where the output light intensity has dropped to 10% of the output light intensity Inom, 2 in the straight ahead direction 58. In the present exemplary embodiment, γ is about 34°. In the upper portion of FIG. 1B, a horizontal opening angle of 2*β of the taxi light output of the right aircraft headlight 104 is depicted. In particular, the taxi light output has a horizontal opening angle of β to each side of the angled orientation direction 64, which has a horizontal angle of δ=45° with respect to the straight ahead direction 58. The opening angle of 2*β is defined as that angle where the output light intensity has dropped to 10% of the output light intensity Inom, 104 in the angled orientation direction 64. In the present exemplary embodiment, β is about 30°. It is pointed out that the output light intensity distribution by the right aircraft headlight 104 is shown as originating from the front running gear of the aircraft 100. While this is not entirely correct, the comparably small offset between the front running gear and the wing root section is negligible in the far field light intensity distribution.

FIGS. 1A and 1B illustrate that the overall light output by the aircraft headlight system may be composed from multiple partial light outputs, stemming from multiple aircraft headlights. However, it is stressed that the resulting overall light output may also be looked at as a single, high level light output, irrespective of its composition. In other words, the light output of the aircraft headlight system may be considered as having a single output light intensity distribution.

Figure 2:
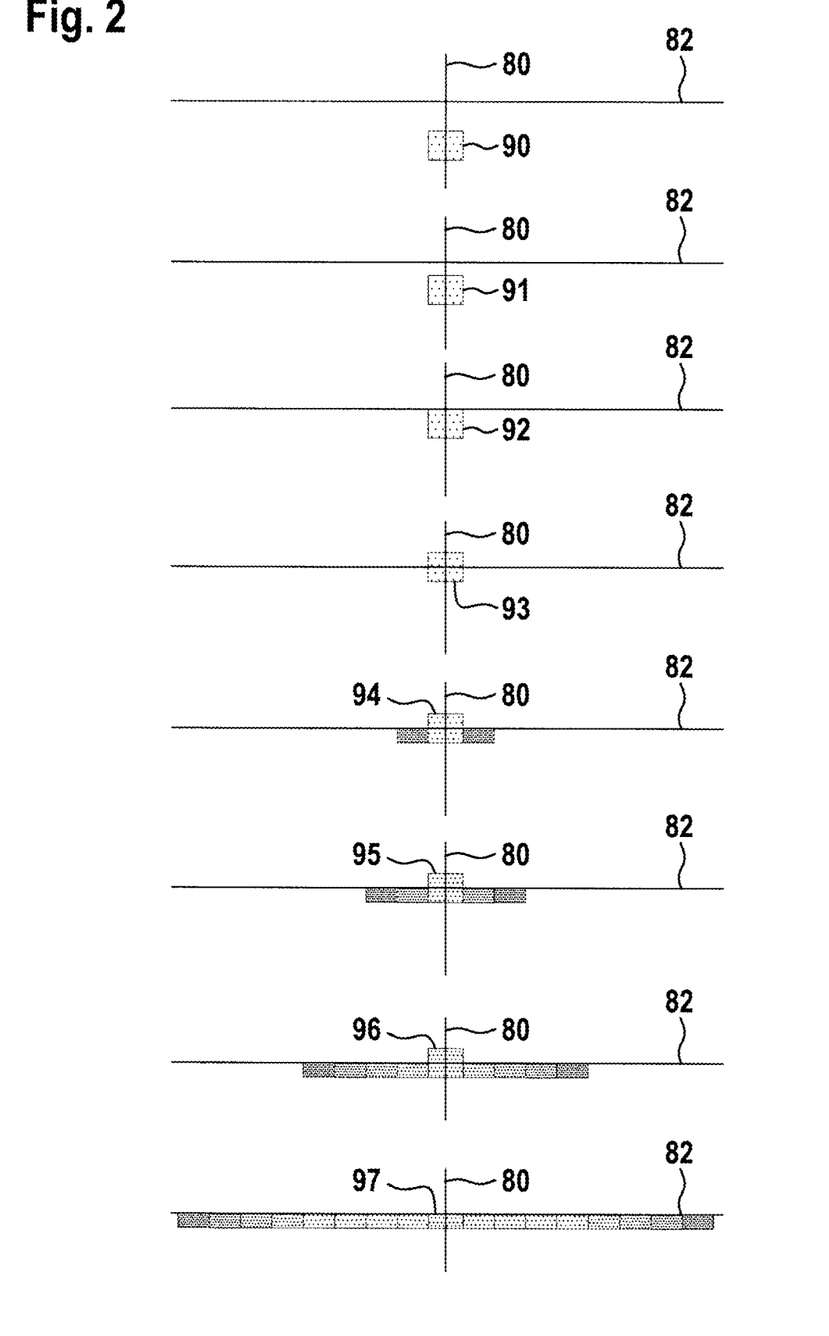
FIG. 2 shows exemplary light outputs, as emitted by an aircraft headlight system when operated by a method in accordance with exemplary embodiments of the invention.

FIG. 2 illustrates exemplary light outputs, as emitted by an aircraft headlight system when operated by a method in accordance with exemplary embodiments of the invention. In particular, FIG. 2 illustrates various output light intensity distributions, having different vertical and horizontal opening angles, different directions, and regions of different intensities. The output light intensity distributions are depicted with respect to a vertical reference plane 80, containing the direction of longitudinal extension of the aircraft fuselage, and with respect to a horizontal reference plane 82, which is in parallel to the ground when the aircraft is taxiing. The intersection between the vertical reference plane 80 and the horizontal reference plane 82 runs through the cockpit of the aircraft.

FIG. 2 illustrates the transformation of a landing light output 90 into a taxi light output 97. The landing light output 90 is depicted in the top most illustration of FIG. 2, while the taxi light output 97 is depicted in the bottom most illustration of FIG. 2. The landing light output 90 is the result of an aircraft headlight system in accordance with an exemplary embodiment of the invention, such as the system shown in FIG. 1, being operated in a landing light mode. Analogously, the taxi light output 97 is the result of an aircraft headlight system in accordance with an exemplary embodiment of the invention being operated in a taxi light mode.

In between the illustration of the landing light output 90 and the illustration of the taxi light output 97, FIG. 2 illustrates six intermediate light outputs 91, 92, 93, 94, 95, and 96. In operation, the landing light output 90 is transformed into the taxi light output 97 via the six intermediate light outputs 91, 92, 93, 94, 95, and 96, as will be described in detail below. The depicted light outputs 90-97 illustrate a sequence over time, as emitted by an aircraft headlight system in accordance with exemplary embodiments of the invention. Again, it is pointed out that the depicted light outputs may stem from one aircraft headlight or may be the result of the simultaneous operation of multiple aircraft headlights.

The landing light output 90 is angled downwards vertically, is not angled horizontally, has a comparably narrow opening angle, and has a comparably high light intensity. In this way, the landing light output 90 takes into account the downwards angled viewing direction of the pilots during descent and the need for a bright illumination of the distant runway during descent.

After touch-down of the aircraft, the exemplary aircraft headlight system enters a transformation of the landing light output 90 into the taxi light output 97. This transformation may be triggered by the pilots or may be triggered in an automated manner after touch-down via suitable sensors.

During a first phase of the transformation, the landing light output 90 is transformed into a take-off light output 93, which is the result of the aircraft headlight system being operated in a take-off light mode. This first phase of the transformation comprises a first intermediate light output 91, a second intermediate light output 92, and a third intermediate light output 93, which is the take-off light output 93. The landing light output 90 and the first to third intermediate light outputs 91 to 93 differ with respect to their downwards angles. While the landing light output 90 is angled downwards 10°, the take-off light output is not angled downwards, but pointed straight ahead, both horizontally and vertically. The first and second intermediate light outputs are intermediate states, being angled downwards 3.33° and 6.66°, respectively, in the exemplary embodiment of FIG. 2. The transition from the landing light output to the first intermediate light output 91 takes place 200 ms after the pilot command to transition to the taxi light mode in the exemplary embodiment of FIG. 2. Each of the first, second and third intermediate light outputs are present for about 1 s in the exemplary embodiment of FIG. 2. The vertical and horizontal opening angles as well as the brightness are not altered in the first phase of the transformation. For the first, second and third intermediate light outputs 91, 92, 93 to be present, the aircraft headlight system is operated in according first, second and third intermediate lighting modes.

During a second phase of the transformation, the take-off light output 93 is transformed into the taxi light output 97. This second phase of the transformation comprises a fourth intermediate light output 94, a fifth intermediate light output 95, and a sixth intermediate light output 96. From the third intermediate light output 93 to the fourth intermediate light output 94 as well as from the fourth intermediate light output 94 to the fifth intermediate light output 95 as well as from the fifth intermediate light output 95 to the sixth intermediate light output 96 as well as from the sixth intermediate light output 96 to the taxi light output 97, the horizontal opening angle is respectively broadened. In the transition step from the third intermediate light output 93 to the fourth intermediate light output 94, an opening angle delta is added. This opening angle delta is about twice the width of the take-off light output 93. Accordingly, the width of the fourth intermediate light output 93 is about three times the width of the third intermediate light output. In the ensuing transition steps, the opening angle delta is respectively doubled. Accordingly, the widths of the fifth intermediate light output 95, the sixth intermediate light output 96 and the taxi light output 97 are five times, 9 times, and 17 times the width of the take-off light output 93, respectively. While the horizontal opening angle is continuously broadened, the peak light intensity, which remains in the straight ahead direction, is reduced by about 50% in each transition step from the third intermediate light output 93 to the taxi light output 97. Each of the fourth, fifth, and sixth intermediate light output 94, 95, 96 has a decaying light intensity towards larger deviations from the straight ahead direction. In this way, a continuous transformation from the landing light output 90 to the taxi light output 97 takes place. Each of the fourth, fifth, and sixth intermediate light outputs 94, 95, 96 is present for about 1 s. Also, with the light output getting wider and the peak intensity going down, a substantially constant overall power draw may be achieved. For the fourth, fifth and sixth intermediate light outputs 94, 95, 96 to be present, the aircraft headlight system is operated in according fourth, fifth and sixth intermediate lighting modes.

It is pointed out that the number of intermediate lighting modes and the depicted output light intensity distributions of the intermediate light outputs, as shown in FIG. 2, are exemplary in nature. There can be more or less intermediate lighting modes, and the transition steps may be carried out differently. However, the intermediate lighting modes may be selected in a way that allows for a convergent transformation from the landing light mode to the taxi light mode.

Figure 3A:
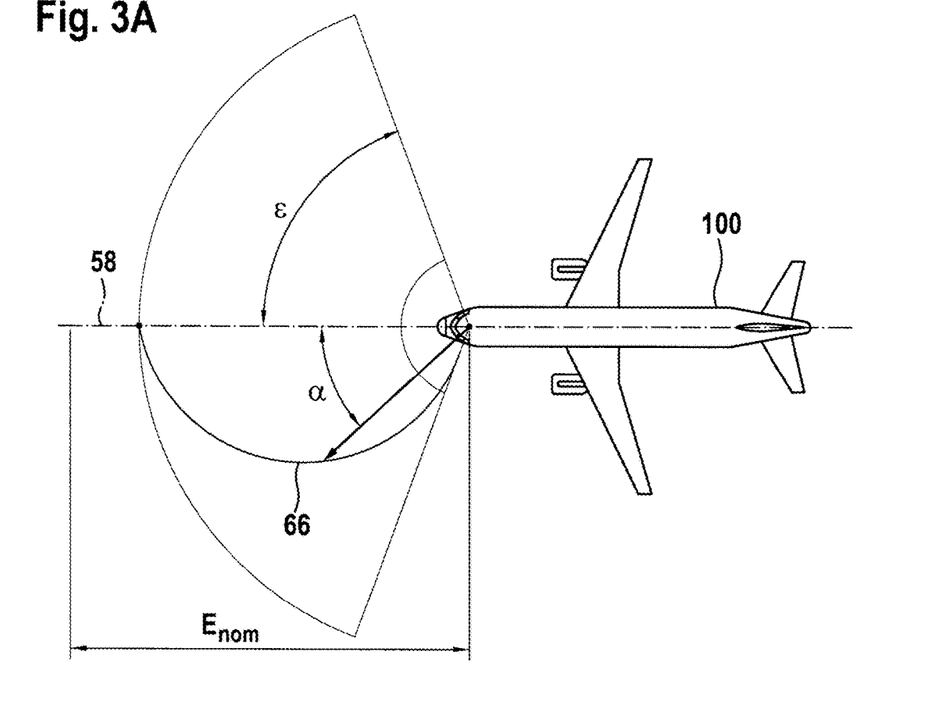
FIGS. 3A-3D show an exemplary taxi light output, as provided by an aircraft headlight system in accordance with exemplary embodiments of the invention.

FIG. 3 illustrates various details of an exemplary taxi light output, as present at the end of the transformation from the landing light output to the taxi light output, as for example described with respect to FIG. 2. In FIG. 3A, a reference cosine illumination distribution 66 is shown. The reference cosine illumination distribution 66 is provided with respect to a nominal illumination value $E_{nom}$ and is in accordance with the formula:

$$E(\alpha)[lx] = \cos(\alpha * 1.145) * E_{nom}.$$

The opening angle $2*\varepsilon$, which is defined as the point where the illumination has decayed to 10% of Enom is 148°. The reference cosine illumination distribution 66 is a minimum illumination distribution, with the taxi light output of the aircraft headlight system of FIG. 3 being between this reference cosine illumination distribution 66 and three times this reference cosine illumination distribution 66.

Figure 3B:
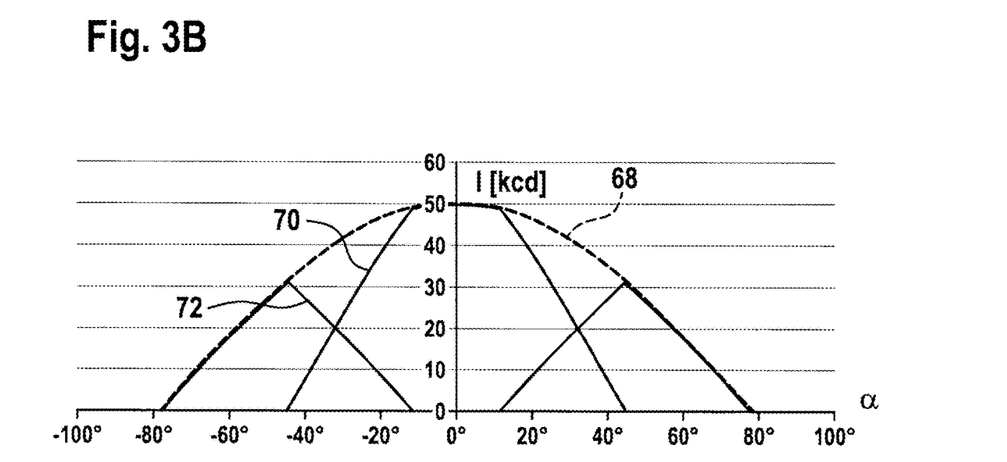

FIG. 3B shows the taxi light output in terms of an output light intensity distribution 68. The output light intensity distribution of the taxi light output, as used herein in the broad sense of the whole light output during taxiing, is the result of a taxi light output 70 in the narrow sense, i.e. a narrow taxi light output 70 around the straight ahead direction, and a runway turn-off light output 72. The taxi light output 70 in the narrow sense and the runway turn-off light output 72 may stem from different aircraft headlights or may by jointly provided by a single aircraft headlight or may be jointly provided by multiple aircraft headlights, which all provide part of the taxi light output 70 in the narrow sense and the runway turn-off light output 72.

Figure 3C:
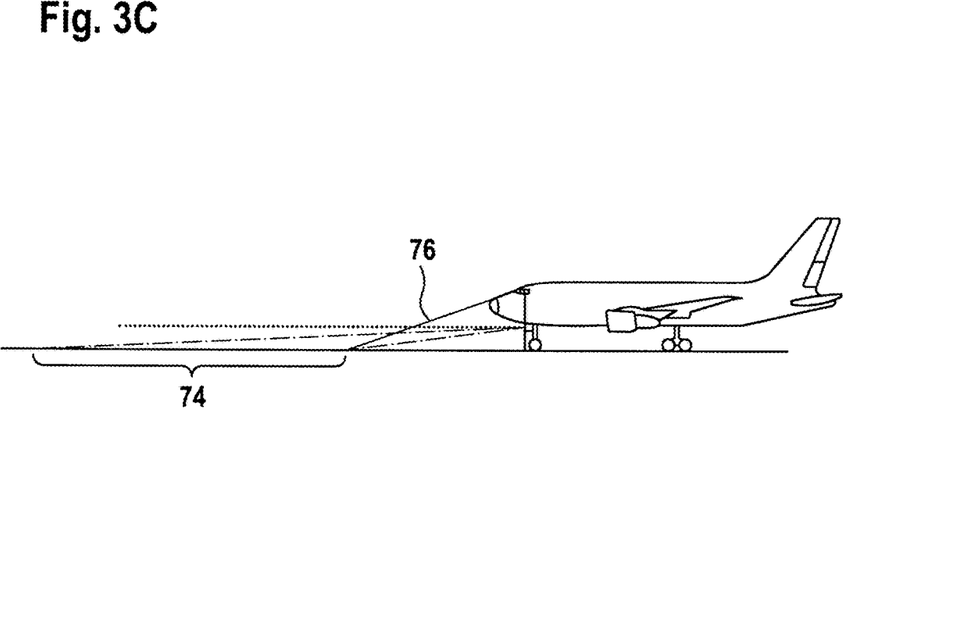
Figure 3D:
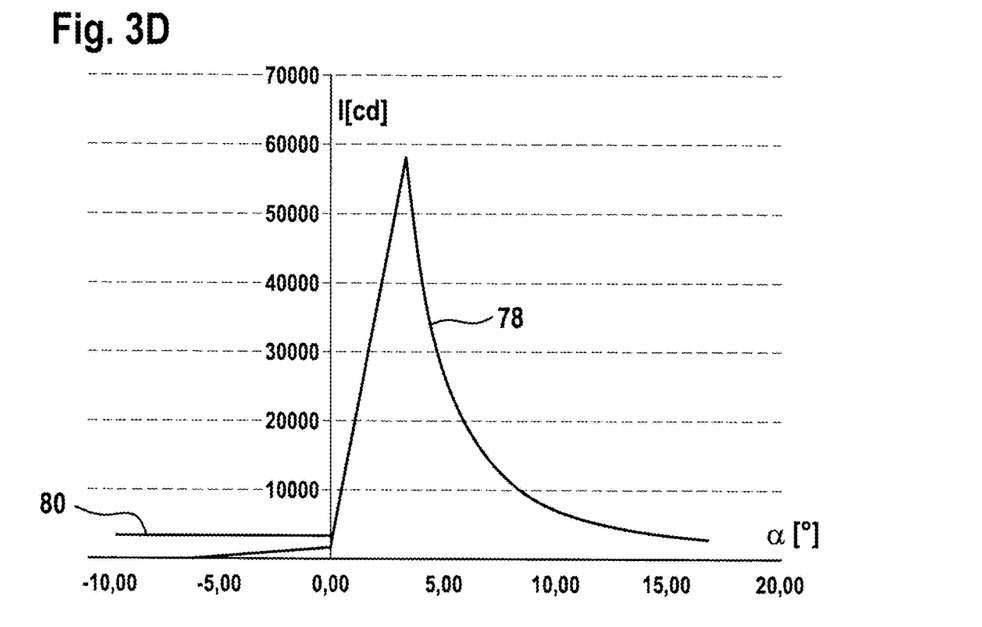

Both FIGS. 3A and 3B deal with the horizontal distribution of the taxi light output, while FIGS. 3C and 3D deal with the vertical distribution of the taxi light output.

In FIG. 3C, an area of desired uniform illumination 74 is depicted, whose one end is defined by the pilots' viewing direction 76 that is maximally downwards and whose other end is defined by a reasonable viewing area for the pilots. In order to reach a desired uniform illumination in the area of desired uniform illumination 74, a vertical light intensity distribution 78 is provided in accordance with a square function. With only a limited amount of light being desired above the horizontal plane, in order to prevent undesired reflections towards the pilot, as illustrated by limit value 80, the vertical light intensity distribution 78 has a steep ramp between the other end of the area of desired uniform illumination 74 and the horizontal plane, indicated by the angle $\alpha = 0°$ in FIG. 3D.

Figure 4A:
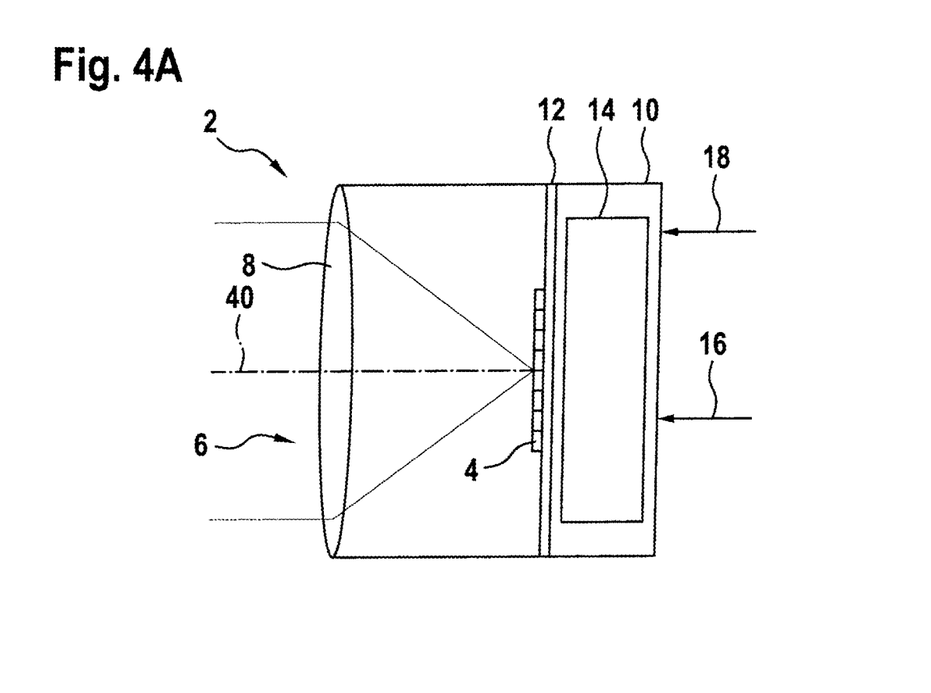
FIGS. 4A-4B show a schematic illustration of an aircraft headlight in accordance with exemplary embodiments of the invention.

FIG. 4A shows a schematic illustration of an aircraft headlight 2 in accordance with an exemplary embodiment of the invention. The aircraft headlight 2 comprises a housing 10, whose inner space is separated into two parts by a mounting plate 12. Attached to the mounting plate 12, there is provided an LED group 4. The LED group 4 comprises a two-dimensional array of LEDs, one row of which is shown in the schematic illustration of FIG. 4A. The depicted row consists of eight individual LEDs arranged in a linear configuration in the exemplary embodiment. The aircraft headlight 2 further comprises an optical system 6. In the exemplary embodiment of FIG. 4A, the optical system 6 consists of a lens 8. In operation, the LEDs of the LED group 4 emit light towards the lens 8 of the optical system 6.

On the other side of the mounting plate 12, there is provided a control unit 14. The control unit 14 is coupled to a power input 16 and to a control input 18. In this way, the control unit 14 receives power from an external power source, such as the aircraft power network, via the power input 16. It further receives control commands via the control input 18. The control commands may be received from the pilots or form the board computer or from suitable sensors.

The control unit 14 is further coupled to the LED group 4 and controls each of the LEDs of the LED group 4 individually. In particular, the control unit 14 is configured to selectively switch each of the LEDs of the LED group 4 on, depending on the operating mode that the control unit 14 determines appropriate for the received control commands. It is also possible that the control unit 14 determines an appropriate amount of dimming for each of the LEDs of the LED group 4. The control unit 14 determines the appropriate operating mode on the basis of the control commands. In particular, in response to a light output transformation command, the control unit 14 may enter a set sequence of operating modes and may control the LEDs of the LED group 4 accordingly for each of the operating modes. The control unit 14 may have hardware circuitry for determining an operating mode and controlling the LEDs. It is also possible that the control unit 14 has a microprocessor running a software program. A combination of hardware and software is also possible.

Figure 4B:
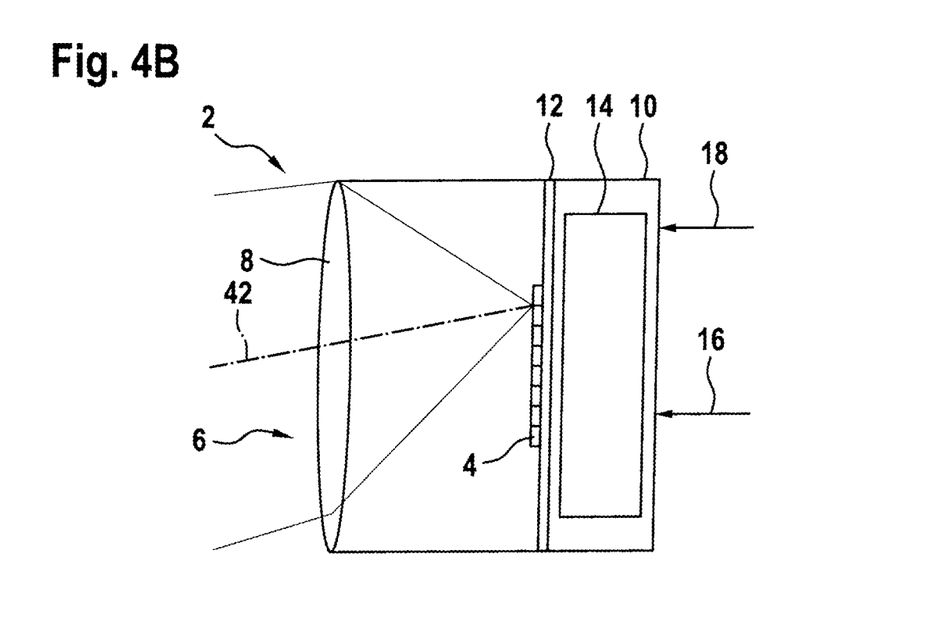

In FIG. 4A, a first illustrative operating mode of the aircraft headlight 2 is shown. In the first illustrative operating mode, the two center LEDs of the shown portion of the LED group 4 are switched on, i.e. the two center LEDs emit light in the first illustrative operating mode. As can be seen from the depicted three exemplary light rays, the lens 8 substantially collimates the light emitted by the LEDs and outputs said light in a first main light emission direction 40. In FIG. 4B, a second illustrative operating mode of the dynamic exterior aircraft light unit 2 of FIG. 4A is shown. In particular, in the second illustrative operating mode, the top two LEDs of the shown portion of the LED group 4 are switched on. The light emitted by the two top LEDs of the LED group 4 is transformed into an output light intensity distribution of the second illustrative operating mode by the lens 8. As can be seen from the three depicted exemplary light rays, the light of the top two LEDs of the LED group 4 results in an output light intensity distribution that is angled somewhat towards the bottom in the drawing plane of FIG. 4B. The main light emission direction 42 of the output light intensity distribution of the second illustrative operating mode is slightly angled towards the bottom in the drawing plane of FIG. 4B.

From the comparison of FIG. 4A and FIG. 4B, it can be seen that each of the LEDs of the LED group 4 has a different contribution to the overall output light intensity distribution of the aircraft headlight 2. It is apparent that a wide variety of output light intensity distributions can be achieved by operating different subsets of the LEDs of the LED group 4. Accordingly, various different operating modes of the dynamic exterior aircraft light unit 2 with different output light intensity distributions can be achieved by operating different subsets of LEDs. The downward angled illumination of FIG. 4B may be associated with the landing light mode, discussed above, while the straight ahead illumination of FIG. 4A may be associated with the take-off light mode, discussed above.

The exemplary aircraft headlight 2 of FIG. 4 is configured to have a plurality of operating modes, with the operating modes differing with respect to their light outputs. The selection of the operating mode is carried out on the basis of the control commands received at the control input 18 and on the basis of the control sequence provided by the control unit 14 as a response to the control commands.

The aircraft headlight 2 may be arranged at the running gear of the aircraft. Similar or equal aircraft headlights may be arranged at wing root sections of the aircraft or at any other suitable structure. It may have a lens cover that protects its face from environmental influences.

Figure 5:
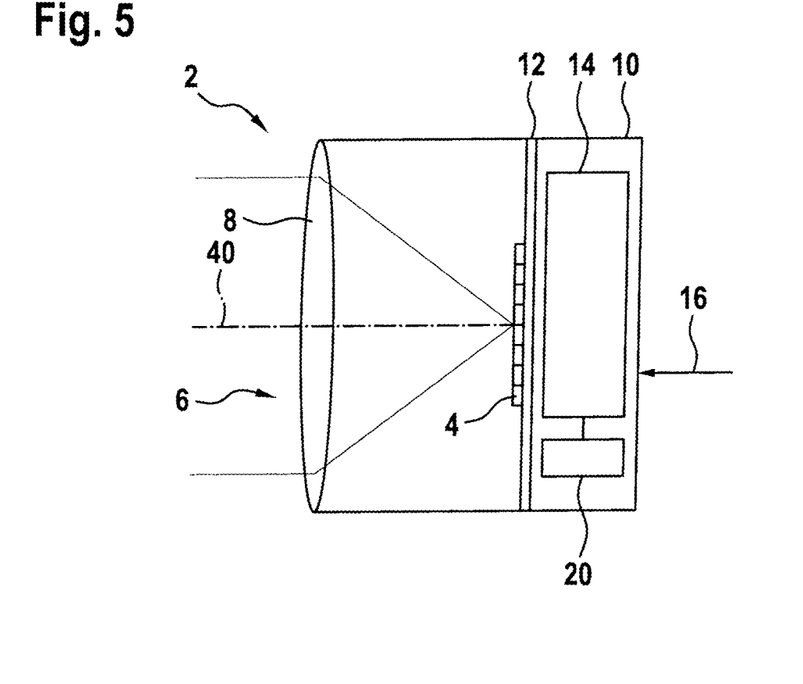
FIG. 5 shows a schematic illustration of another aircraft headlight in accordance with exemplary embodiments of the invention.

FIG. 5 shows a schematic illustration of an aircraft headlight 2 in accordance with another exemplary embodiment of the invention. The aircraft headlight 2 is very similar to the aircraft headlight 2 of FIG. 4 and is shown in the same operating mode, as depicted in FIG. 4A. The aircraft headlight 2 of FIG. 5 differs from the aircraft headlight 2 of FIG. 4 in that it does not have a control input 18. However, the aircraft headlight 2 of FIG. 5 has an touch-down sensor 20, disposed in the housing 10. The touch-down sensor 20 senses the touch-down of the aircraft and conveys that information to the control unit 14. The operation of the control unit 14 is equal to the operation of the control unit 14 of the aircraft headlight 2 of FIG. 4.

FIG. 6 shows a schematic illustration of an alternative combination of an optical system 6 and an LED group 4. This alternative combination is also able to achieve different output light intensity distributions for different operating modes and may thus also be used in aircraft headlights in accordance with exemplary embodiments of the invention.

Figure 6A:
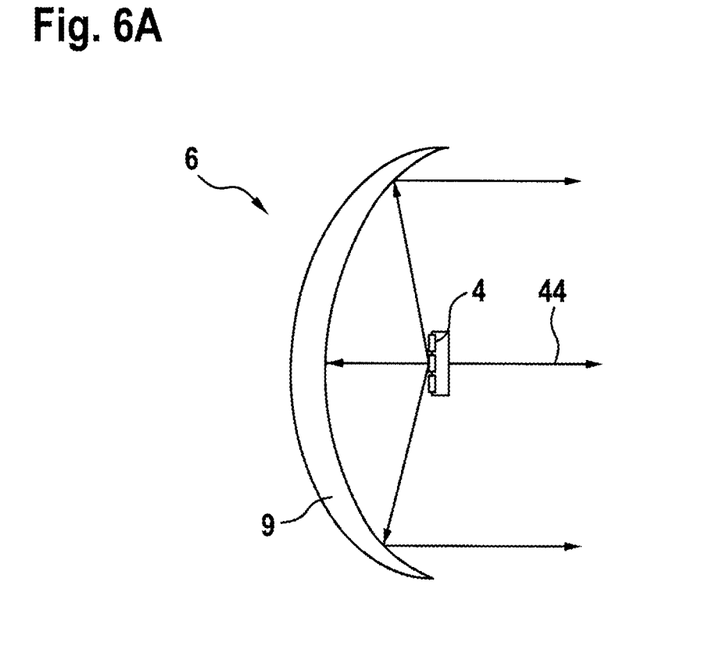
FIGS. 6A-6C show a schematic illustration of a combination of an LED group and an optical system, which can be used in an aircraft headlight in accordance with exemplary embodiments of the invention.
Figure 6B:
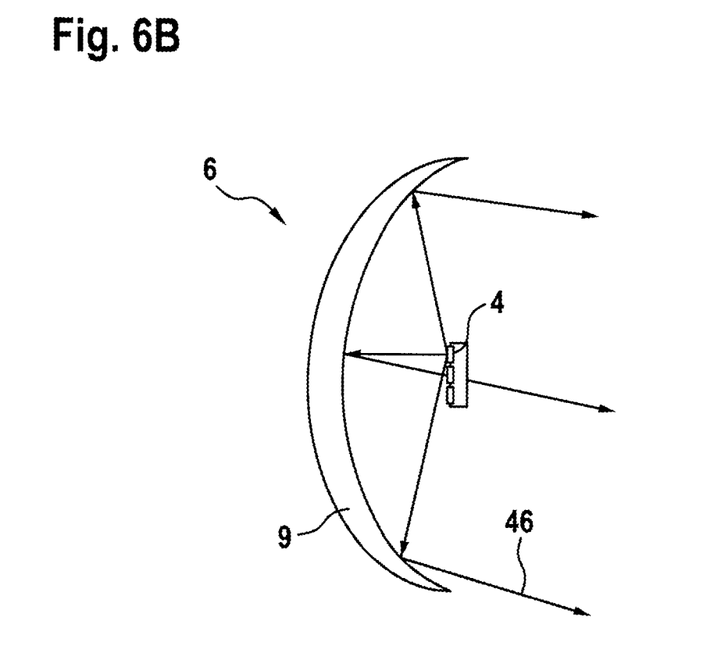
Figure 6C:
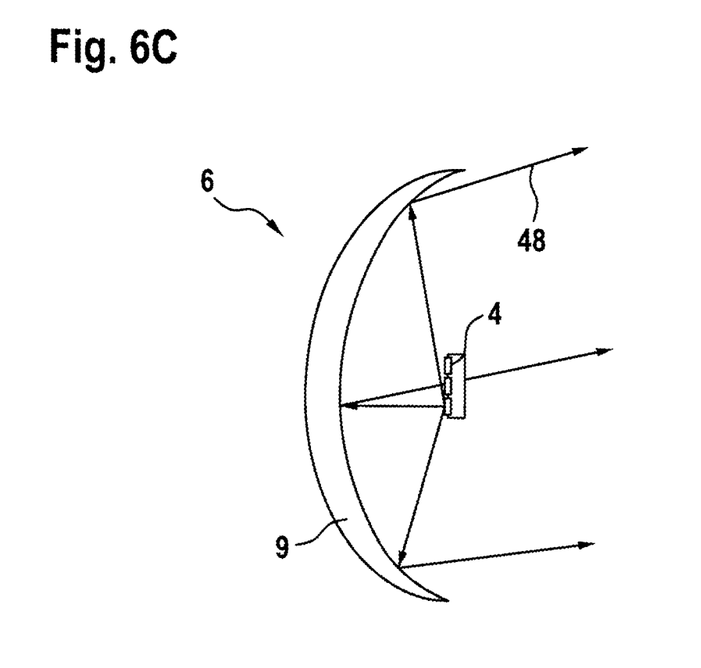

In FIG. 6, the optical system consists of a reflector 9, which is a collimating parabolic reflector in the exemplary embodiment of FIG. 6. The center LED of the LED group 4 is arranged in the focal point of the reflector 9, leading to a collimated output light intensity distribution in a direction 44 in a first illustrative operating mode (FIG. 6A), wherein the center LED is switched on. The top and bottom LEDs of the LED group 4 are arranged at a distance from the focal point of the reflector 9, such that the switching on of the top LED or of the bottom LED of the LED group 4 results in an illustrative output light intensity distribution that is angled towards the bottom (in a direction 46 in FIG. 6B) or angled towards the top (in a direction 48 in FIG. 6C) and has a somewhat wider, but still narrow opening angle.

Again, it can be seen that the selective switching of different LEDs of the LED group 4 leads to different contributions to the overall output light intensity distribution of the aircraft headlight 2. It is again apparent that a wide variety of operating modes, having different output light intensity distributions, can be achieved via the switching of different subsets of LEDs.

It is pointed out that the optical system 6 may comprise multiple elements, that the optical system 6 may comprise a combination of one or more lenses and/or one or more reflectors, and that the lenses and reflectors may be non-collimating lenses and non-collimating reflectors, depending on the output light intensity distributions that are to be achieved in the different operating modes. It is further pointed out that larger numbers of operating modes may be achieved with larger numbers of LEDs, in particular with two-dimensional arrangements of LEDs having a large number of LEDs. The principles illustrates in FIGS. 4 to 6 may be extended to more complex LED arrangements within the aircraft headlight 2.

It is further pointed out that the group of LEDs may comprise two or more sub-groups of LEDs, with each sub-group of LEDs having its own optical system associated therewith. For example, the aircraft headlight 2 may have multiple optical sets, each optical set consisting of a lens 8 and LEDs 4, as depicted in FIG. 4, or of a reflector 9 and LEDs 4, as depicted in FIG. 6. It is also possible that each LED of the group of LEDs has its own optical system associated therewith.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A method of operating an aircraft headlight system of an aircraft, the aircraft headlight system having at least one headlight,
    wherein the method comprises the steps of:
    operating the aircraft headlight system in a landing light mode during a descent of the aircraft, with the at least one headlight emitting a landing light output in the landing light mode,
    operating the aircraft headlight system in a taxi light mode during taxiing of the aircraft, with the at least one headlight emitting a taxi light output in the taxi light mode, and
    transforming the landing light output into the taxi light output after touch-down of the aircraft by operating the aircraft headlight system in at least one intermediate lighting mode between operating the aircraft headlight system in the landing light mode and operating the aircraft headlight system in the taxi light mode.

2. The method according to claim 1, wherein the step of transforming the landing light output into the taxi light output lasts between 3s and 10s, in particular between 4s and 7s, more in particular about 5s.

3. The method according to claim 1, wherein the at least one intermediate lighting mode comprises a sequence of a plurality of intermediate lighting modes, with an intermediate output light intensity distribution of each of the plurality of intermediate lighting modes having a wider horizontal illumination angle than a respectively preceding one of the plurality of intermediate lighting modes.

4. The method according to claim 3, wherein the intermediate output light intensity distribution of each of the plurality of intermediate lighting modes has a lower peak light intensity than the respectively preceding one of the plurality of intermediate lighting modes.

5. The method according to claim 1, wherein the aircraft headlight system has a take-off light mode and wherein the at least one intermediate lighting mode comprises the take-off light mode.

6. The method according to claim 1, wherein the taxi light output has a horizontal taxi light illumination distribution that is between a reference cosine distribution around a straight ahead direction of the aircraft and the reference cosine distribution, multiplied by three.

7. The method according to claim 1, wherein a vertical change of a peak intensity direction of the aircraft headlight system during the transforming of the landing light output into the taxi light output is between 2°/s and 5°/s, in particular between 2.5°/s and 3.5°/s, more in particular about 3°/s.

8. The method according to claim 1, wherein the at least one intermediate lighting mode consists of at least three intermediate lighting modes, in particular of between three and 15 intermediate lighting modes, further in particular of between five and ten intermediate lighting modes.

9. An aircraft headlight, configured for being mounted to an aircraft for illuminating an aircraft environment, the aircraft headlight comprising:
   an LED group, comprising a plurality of LEDs, and
   an optical system, comprising at least one optical element, the optical system being associated with the LED group for shaping a light output from the light emitted by the LED group,
   wherein the LED group and the optical system are stationary within the aircraft headlight, with each LED of the LED group having a set position with respect to the optical system,
   wherein the aircraft headlight is configured to be operated in a landing light mode having a landing light output, a taxi light mode having a taxi light output and at least one intermediate lighting mode having at least one intermediate light output, with a respective subset of the plurality of LEDs being switched on in each of the landing light mode, the taxi light mode and the at least one intermediate lighting mode, and
   wherein the aircraft headlight is configured to transform the landing light output into the taxi light output by operating in the at least one intermediate lighting mode between operating in the landing light mode and operating in the taxi light mode.

10. An aircraft headlight according to claim 9, wherein the plurality of LEDs are dimmable.

11. An aircraft headlight according to claim 9, wherein the aircraft headlight is configured to transform the landing light output into the taxi light output by operating in at least three intermediate lighting modes, in particular in between three and 15 intermediate lighting modes, further in particular in between five and ten intermediate lighting modes, between operating in the landing light mode and operating in the taxi light mode.

12. An aircraft headlight according to claim 9, wherein the aircraft headlight is configured to transform the landing light output into the taxi light output over a transformation interval of between 3s and 10s, in particular of between 4s and 7s, further in particular of about 5s.

13. An aircraft headlight according to claim 9, further comprising a control unit, wherein the control unit is configured to switch on the respective subsets of the plurality of LEDs in accordance with the landing light mode, the taxi light mode and the at least one intermediate lighting mode.

14. An aircraft, comprising at least one aircraft headlight in accordance with claim 9.

15. The aircraft according to claim 14, comprising one or more, forming an aircraft headlight system of the aircraft, wherein the aircraft headlight system includes a first aircraft headlight being mounted to a front running gear of the aircraft and a second and third aircraft headlights being mounted to a left wing root section and a right wing root section of the aircraft, respectively and a third aircraft headlight.

* * * * *